US005888333A

United States Patent [19]

Ono et al.

[11] Patent Number: 5,888,333

[45] Date of Patent: Mar. 30, 1999

[54] INK JET HEAD PRODUCTION METHOD, INK JET HEAD, AND INK JET RECORDING APPARATUS

[75] Inventors: Takayuki Ono; Masaki Inaba, both of Kawasaki; Tsuyoshi Orikasa, Musashimurayama; Haruhiko Terai; Kiyomitsu Kudo, both of Yokohama, all of Japan

[73] Assignee: Canon Kabushiki Kaisha, Tokyo, Japan

[21] Appl. No.: 550,678

[22] Filed: Oct. 31, 1995

[30] Foreign Application Priority Data

Oct. 31, 1994 [JP] Japan .................................... 6-266590
Oct. 31, 1994 [JP] Japan .................................... 6-266594

[51] Int. Cl.[6] .................................................... B29C 65/48

[52] U.S. Cl. ................................ 156/292; 347/40; 347/46

[58] Field of Search .................................... 156/292, 299; 347/40, 56

[56] References Cited

U.S. PATENT DOCUMENTS

| | | | |
|---|---|---|---|
| 4,313,124 | 1/1982 | Hara | 347/57 |
| 4,345,262 | 8/1982 | Shirato et al. | 347/10 |
| 4,459,600 | 7/1984 | Sato et al. | 347/47 |
| 4,463,359 | 7/1984 | Ayata et al. | 347/56 |
| 4,558,333 | 12/1985 | Sugitani et al. | 347/65 |
| 4,608,577 | 8/1986 | Hori | 347/66 |
| 4,723,129 | 2/1988 | Endo et al. | 347/56 |
| 4,740,796 | 4/1988 | Endo et al. | 347/56 |
| 4,975,143 | 12/1990 | Drake et al. | 438/107 |
| 5,079,189 | 1/1992 | Drake et al. | 438/21 |
| 5,098,503 | 3/1992 | Drake | 156/257 X |
| 5,218,754 | 6/1993 | Rangappan | 29/611 |
| 5,243,755 | 9/1993 | Inaba et al. | 29/890.1 |
| 5,257,043 | 10/1993 | Kneezel | 347/42 |
| 5,373,633 | 12/1994 | Satio et al. | 29/890.1 |

FOREIGN PATENT DOCUMENTS

| | | |
|---|---|---|
| 0419193 | 3/1991 | European Pat. Off. . |
| 0593040 | 4/1994 | European Pat. Off. . |
| 54-56847 | 5/1979 | Japan . |
| 59-123670 | 7/1984 | Japan . |
| 59-138461 | 8/1984 | Japan . |
| 60-71260 | 4/1985 | Japan . |
| 2-212162 | 8/1990 | Japan . |
| 3-177942 | 8/1991 | Japan . |
| 3-9177042 | 8/1991 | Japan . |
| 4-229278 | 8/1992 | Japan . |

*Primary Examiner*—Francis J. Lorin
*Attorney, Agent, or Firm*—Fitzpatrick, Cella, Harper & Scinto

[57] ABSTRACT

An ink jet head manufacturing method, includes steps of disposing a plurality of heater boards each having a plurality of energy generating elements, on a base plate; mounting on the base plate a top plate having a plurality of ink passage forming grooves corresponding to respective energy generating elements; the improvement residing in that in said disposing step, said heater boards are directly disposed with a gap between adjacent ones, and that in said mounting step, the top plate is bonded on the base plate.

13 Claims, 9 Drawing Sheets

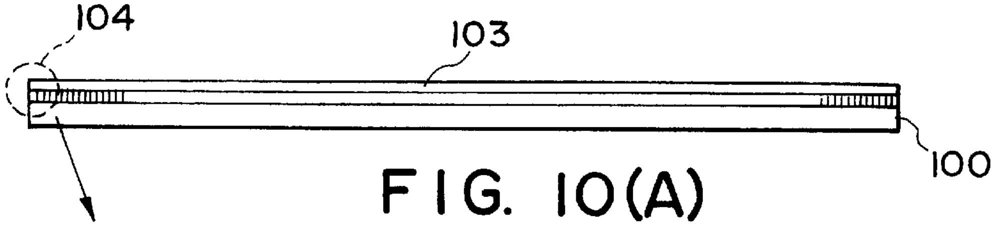
FIG. 10(A)
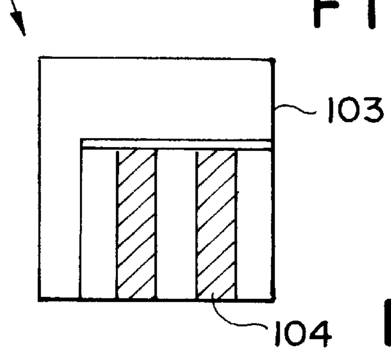
FIG. 10(B)
FIG. 11(A)
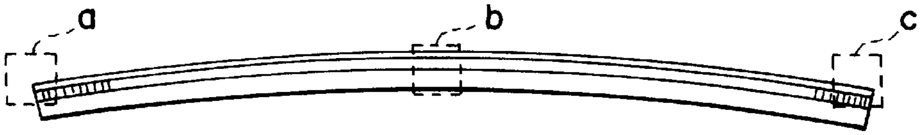
FIG. 11(C)
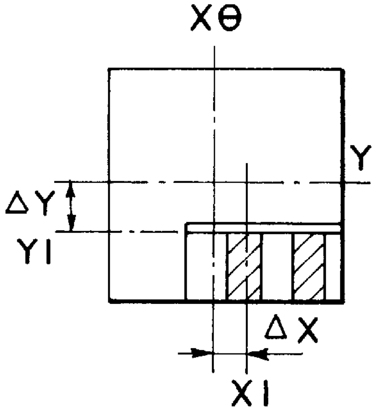
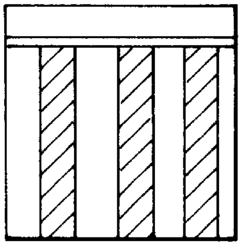
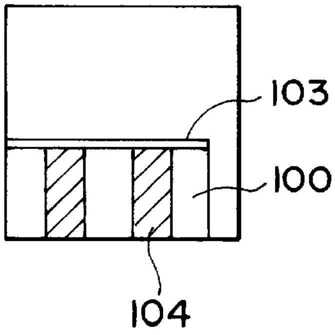
FIG. 11(B)
FIG. 11(D)

INK JET HEAD PRODUCTION METHOD, INK JET HEAD, AND INK JET RECORDING APPARATUS

FIELD OF THE INVENTION AND RELATED ART

The present invention relates to a method for producing a full-line type ink jet head comprising a base plate, plural heater substrates (hereinafter, heater board) arranged on the base plate in a predetermined manner, and a top plate assembled onto the base plate, wherein the heater substrates comprise plural energy generating elements (hereinafter, heater), and the top plate is provided with plural groves, each of which serves as a nozzle correspondent to one of heaters, and plural ink ejection orifices, each of which is connected to one of the grooves. The present invention also relates to an ink jet head, and an ink jet head recording apparatus.

Japanese Laid-Open Patent Application No. 212162/1990 discloses a conventional recording head production method in which plural heater boards are aligned in such a manner that the end surfaces of each heater board are abutted against those of the adjacent heater boards.

Japanese Laid-Open Patent Application No. 229278/1992 discloses another method in which notched portions are formed in the part of the unit constituted of the heater boards and top plate, and the notched portion is abutted against a reference provided on the base plate.

Japanese Laid-Open Patent Application No. 177042/1991 discloses another method in which a pattern is formed by means of irradiating light onto the base plate to form a pattern, and the formed pattern is combined with the pattern of an alignment substrate to form an array.

However, each of the aforementioned examples of the conventional method suffers from the following shortcomings.

The method disclosed in Japanese Laid-Open Patent Application No. 212162/1990 suffers from the following shortcomings.

(1) The and surfaces of each heater board are abutted against those of the adjacent heater boards; therefore, the accuracy with which the heater board is cut at each end, results in the arrangement accuracy. Consequently, a high degree of accuracy is required of an apparatus used for cutting the heater board, which in turn requires a large amount of time and effort to maintain and control the cutting apparatus, mating this method unsuitable for mass-production.

(2) The end surfaces of the heater board are mechanically abutted to each other; therefore, the heater boards are liable to be damaged (fragmentation, cracking, chipping, or the like, of silicon substrate).

The method disclosed in Japanese Laid-Open Patent Application No. 229278/1992 suffers from the following shortcomings.

(3) A butting block must be produced to form the notched portion which serves as the reference, and this portion affects the accuracy with which the heater boards are arranged later; therefore, the production of the butting block requires a highly precise mechanical process, which is extremely difficult.

All of the aforementioned methods suffer from the following shortcomings (4) It is difficult to regulate the stepped portion of the heater surface of the heater board; therefore, the stepped portion is liable to become the cause of ink ejection failure.

(5) It is difficult to regulate the stepped portion which determines the ejection direction of each heater board; therefore, the stepped portion is liable to become the cause of ink ejection failure.

(6) Even when the heater boards are accurately arranged, when the top plates are not processed uniformly, that is, when the top plates have deformations such as warping, gaps are created at the joint between the heater board and top plate, being liable to cause recording failure.

The method disclosed in Japanese Laid-Open Patent Application No. 177042/1991 suffers from the following shortcomings.

(7) The alignment substrate must be of a material processable by light irradiation; therefore, the number of usable materials is limited.

SUMMARY OF THE INVENTION

The present invention was made in consideration of the shortcomings of the conventional arts described above, and its primary object is to realize a recording head production method capable of precisely producing the heater board, without requiring high accuracy in the structural members, and without limiting the number of the usable materials.

The present invention is characterized in that an ink jet head production method comprises a step in which plural heater boards, containing plural energy generating elements, are aligned on a base plate, and a step in which a top plate provided with plural ink path grooves, each of which is correspondent to one of the energy generating elements, is jointed with the base plate, wherein the heater boards are directly and fixedly placed on the base plate, with predetermined intervals, by means of gluing or the like.

The heater board may be fixedly adhered to the base plate by means of abutting the heater board against the base plate after coating the back surface of the heater board with adhesive.

Further, a predetermined frame-like pattern may be formed on the base plate surface on which the heater boards are aligned.

Further, the heater boards may be aligned on the base plate to match the top plate configuration.

In this case, the heater boards may be aligned on the base plate, on the basis of the top plate measurement which is taken in advance at a different processing location.

Further, the heater boards may be aligned on the base plate, on the basis of the top plate measurement which is taken while aligning the heater boards.

In either of the above cases, when the heater boards are aligned on the base plate, the location of the preceding heater board may be measured in a non-contact manner, and a succeeding heater board may be arranged on the basis of the results of the measurement.

When the predetermined frame-like pattern is formed on the base plate surface on which the heater boards are aligned, the heater boards may be fixedly adhered to the base plate by means of placing the adhesive in advance in the frame-like pattern formed on the base plate.

Further, the heater boards may be fixedly adhered to the base plate by means of allowing the adhesive to flow into the gaps formed between the heater boards and the frame-like pattern of the base plate, from the lateral sides of the heater boards, after the heater boards are abutted against the base plate.

Further, the heater boards may be fixedly adhered to the base plate by means of allowing the adhesive to flow into the gaps formed between the heater boards and the frame-like pattern of the base plate, from the rear sides of the heater boards, after the heater boards are abutted against the base plate.

According to another aspect of the present invention, the present invention is characterized in that a base plate, on which plural heater boards comprising plural ink heating heaters are aligned, is joined with a top plate member provided with the ink paths and ink ejection orifices, to produce an ink ejection head, wherein the healer boards are directly aligned on the top plate member, and fixedly glued thereto.

In this case, the step for directly disposing the heater board on the top member may comprise:

an ink path location computing step for computing the ink path location in the top plate member;

a heater location computing step for computing the location of the ink heating heater on the heater board;

a location-orientation adjustment step for adjusting the location and orientation of the heater board;

a heater board joining step for forming a nozzle unit by means of joining the heater board and top plate in such a manner that the ink path location of the top plate is matched with the heater location of the heater board; and a base plate joining step for joining the nozzle unit with a base plate for fixedly supporting the nozzle unit.

The ink path location comprising step may comprise:

a top member moving step for moving the top plate member from the top member entry location to the ink path location computing point where the ink path location is computed; and a location computing first step for computing the location of the ejection ink path groove formed in the top plate member, and the location of the orifice tip.

The heater location computing step may comprise:

a heater board moving step for moving the heater board from the component entry point to the heater location computing point; and a location computing second step for computing the location of the ink heating heater formed on the heater board, at the heater location computing point.

The location-orientation adjustment step is such a step, in which the location and orientation of the heater board is adjusted using heater board clasping means for clasping and moving the heater board, and may comprise:

a computing step for computing the amount of heater board location-orientation adjustment, on the basis of the location of the ejection ink path groove of the top plate member, and the location of the orifice tip, which are obtained by the location computing first step, and the heater location obtained by the location computing second step; and a heater board location-orientation adjustment step for adjusting the heater board location and orientation, on the basis of the results of the computing step, using the heater board clasping means.

The heater board joining step may comprise:

a top plate member moving step for moving the top plate member from the ink path location computing point to a point where the top plate member and heater board are joined;

a heater board moving step for moving the heater board from the heater location computing point to a point where the top plate member and heater board are joined;

a joining step for joining the top plate member and heater board; and a fixing step for stabilizing the state of fixation.

The base plate joining step may comprise:

a base plate moving step for moving the base plate from a base plate entry point to the base plate joining point;

an adhesive coating step for coating the base plate with adhesive which fixes the nozzle until to the base plate; and a joining step for joining the nozzle unit and base plate.

The ink jet head in accordance with the present invention is produced using one of the aforementioned production methods.

In this case, the energy generating element may be an electrothermal transducer which generates thermal energy for ejecting the ink.

Further, the ink jet head in accordance with the present invention may be such an ink jet head which ejects the ink from the ejection orifices using the film boiling triggered in the ink by the thermal energy applied by the electrothermal transducer.

The ink jet recording apparatus in accordance with the present invention comprises such an ink jet head (or ink jet heads) as described above, and records images by means of ejecting the ink from the ejection orifices of the ink jet head, in response to recording signals.

According to the present invention comprising the aforementioned steps, undesirable effects of non-uniformity in the cutting accuracy of the heater board can be canceled by the placement of the gap between the adjacent heater boards; therefore, even when the cutting accuracy of the base plate in the alignment direction is not uniform, the location of each of the aligned energy generating elements can be accurately matched with the location of the corresponding ink path groove formed in the top plate.

The amount of the gap for realizing the aforementioned arrangement is measured using a non-contact method, and the arrangement is adjusted on the basis of the measurement results. In other words, the components are not located by means of mechanical processing, but instead, their locations are computed using a non-contact method, and then, the subsequent adjustment is made on the basis of the measurement results; therefore, the non-uniformity, which is liable to be caused by the mechanical processing, does not exist, affording accurate alignment.

Since the heater boards are abutted against the base plate, the evenness of the top surface of one heater board with the top surfaces of the other heater boards is improved.

A frame-like pattern is formed on the base plate; therefore, foreign matter such as dust is prevented from invading the area surrounded by the frame-like pattern.

According to the second aspect of the present invention, the heater boards can be aligned according to the degree of warpage which occurs to the top plate during the formation thereof; therefore, the heater boards can be accurately aligned on the top plate.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 10(A) illustrates a state of the seventh embodiment, in which an optical observation system 143 has been moved to the edge of the top plate member 100, and FIG. 10(B) illustrates an image observed through the optical observation system 143.

FIGS. 11(A–D) illustrate how the ink path location and orifice plate location on the deformed top plate are computed, wherein (A) illustrates a state in which the optical observation system 143, which always moves to the same point, relative to the X direction, is picking up the image, and (B)–(D) illustrate images picked up at pick-up points a, b and c, correspondingly, indicated in (A).

DESCRIPTION OF THE PREFERRED EMBODIMENTS

Hereinafter, the embodiments of the present invention will be described with reference to the drawings.

Figure 1:
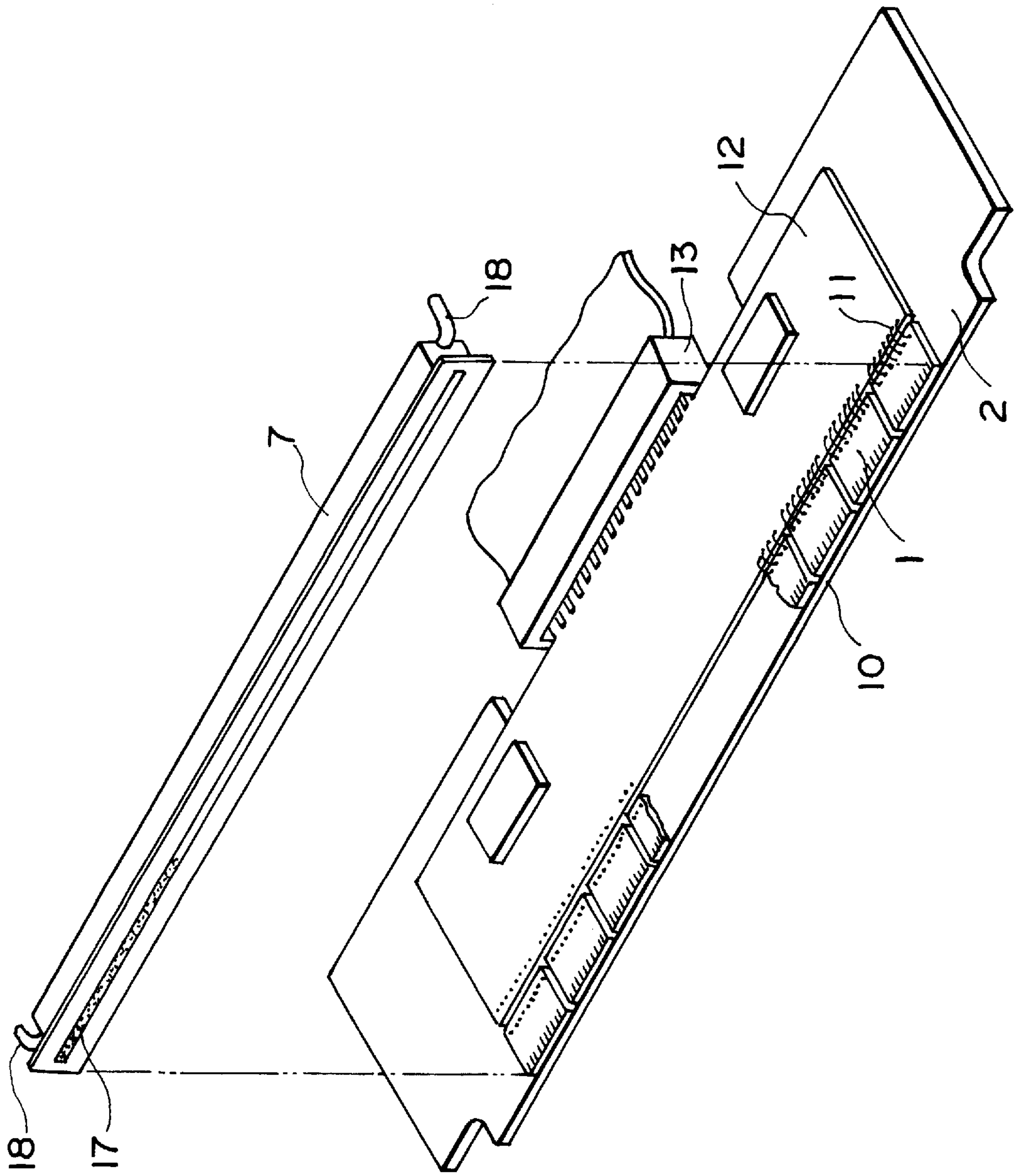
FIG. 1 is a schematic perspective view of the structure of an example of an ink jet head of an extended width produced using the production method in accordance with the present invention.

FIG. 1 is a schematic perspective view of the structure of an example of an ink jet head of an extended width produced using the production method in accordance with the present invention.

The ink jet head illustrated in FIG. 1 is of a full-line type (extended type). Its ink ejection orifice density is 360 dpi (70.5 μm), and the number of the ink ejection orifices is 3,008 (printing width: 212 mm). It comprises a base plate 2 formed of metallic or ceramic material, or the like.

On the base plate 2, plural heater boards, as substrates, composed of glass, Si, or the like, are arranged in a straight line along one of the edges of the base plate 2.

On each of the heater boards 1, plural heaters 10, as energy generating elements, are aligned at a predetermined pitch in the same direction as the heater board arrangement direction, along the same edge of the base plate 2.

Also on each of the heater boards 1, power supply pads are aligned in the same direction as the heater board alignment direction, along the edge opposite to the edge along which the heaters 10 are aligned. The heater 10 as the energy generating element used in this embodiment is an electrothermal transducer for ejecting the ink, but the present invention is not limited by this embodiment; a laminated piezoelectric element may be employed in place of the electrothermal transducer as the heater 10.

Also on the base plate 2, a wiring substrate 12 comprising signal lines and power supply lines to be connected to the power supply pads of each heater board 1 is fixed in such a manner that the power supply pads on the heater board 1, hold a predetermined positional relationship with the signal-power supply pads provided on the wiring substrate 12. The power supply pads on the heater board 1 and the signal-power supply pads provided on the wiring substrate 12 are electrically connected with gold wire 11 or the like.

On the wiring substrate 12, a connector 13 for supplying external printing signals or driving power is attached.

A top plate 7 is placed from above in such a manner that it covers the surfaces of plural heater boards 1, and is glued thereto. The top plate 7 is formed of a resin material, and receives the ink externally through an ink supply pin 18 provided at each end of the top plate 7. Within the top plate 7, a concavity (unillustrated) is formed, which is connected to the ink supply pins 18 and constitutes a common liquid chamber for storing the ink. Further, the top plate 7 comprises plural ink path grooves (unillustrated), each of which is formed to correspond to one of the heaters 10, and plural ink ejection orifices 17, each of which is formed to correspond to one of the ink path grooves. These grooves and orifices are formed using an excimer laser or the like.

When the top plate 7 is formed using glass or metallic material, the common liquid chamber concavity, ink path grooves, and ink ejection orifices 17 may be formed by machining, etching, and the like.

At this point, it will be described how the ink is ejected from each ink ejection orifice 17. The ink, which is supplied by way of an ink supply port 18 into the common liquid chamber concavity, and is temporarily stored therein, invades into each ink path groove due to capillarity, and forms a meniscus at the ink ejection orifice 17. The formed meniscus keeps the ink path groove filled with the ink. In this state, power is supplied to predetermined heaters 10 from an external apparatus, through the connector 13 and wiring substrate 12 illustrated in FIG. 1, causing the predetermined heaters 10 to generate heat. As the heat is generated, the ink on the heater 10 is suddenly heated to generate bubbles in the ink path. Then, as the bubbles expand, the ink is ejected from predetermined ink ejection orifices.

The present invention is also applicable to an ink jet head recording apparatus, which comprises such an ink jet head as described above, and records images by ejecting the ink from the ink ejection orifices of the ink jet head in response to recording signals.

Next, descriptions will be given as to various methods for aligning plural heater boards on the base plate during the production of the ink jet head with the structure described above.

Embodiment 1

Figure 2:
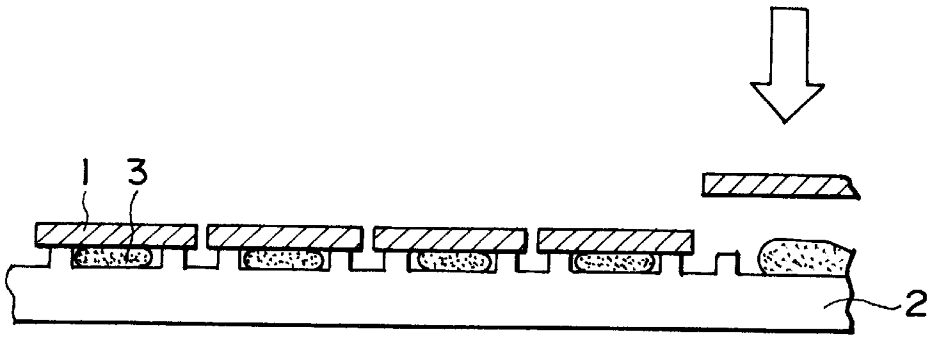
FIG. 2 is a schematic view of the first embodiment of the ink jet head production method in accordance with the present invention, in which the heater boards are directly placed on the base plate, and fixed thereto with adhesive.

FIG. 2 is a schematic view of the first embodiment of the ink jet head production method in accordance with the present invention, in which the heater boards are directly fixed to the base plate using adhesive.

Referring to FIG. 2, according to the production method in this embodiment, a frame-like pattern is formed on the base plate 2, on the surface where the heater boards 1 are to be aligned, and then, adhesive 3 is coated in advance on the base plate 2, on the area with the frame-like pattern. Next, the heater boards 1, the locations of which have been fixed in a different processing area using a non-contact method, are aligned on the base plate 2 in a single line, at the corresponding locations coated with the adhesive 3, maintaining a predetermined interval between the adjacent heater boards 1. Then, each heater board 1 is sucked onto the base plate 2 using the suction hole (unillustrated) provided in each segment of the frame-like pattern coated with the adhesive. The suction is stopped when the adhesive 3 is cured.

It should be noted here that the amount of the adhesive 3 must be moderate, but sufficient, to prevent the adhesive 3 from oozing out of the adhesive coating area. Further, the heater boards are aligned so that the ill effects of non-uniformity in the cutting accuracy of the heater board can be canceled by the provision of the gap between the adjacent heater boards.

Since the heater board is directly placed on the base plate, the evenness of the top surface of one aligned heater board with the top surfaces of the other aligned heater boards is improved.

Embodiment 2

Figure 3:
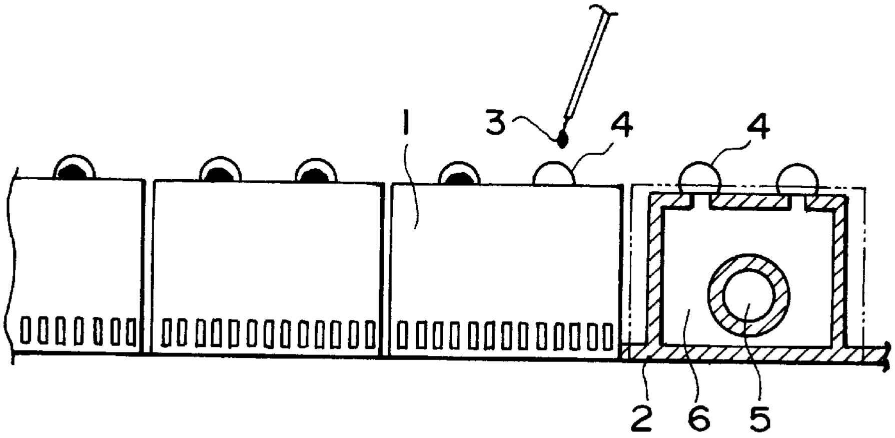
FIG. 3 is a schematic view of the second embodiment of the ink jet head production method in accordance with the present invention.

FIG. 3 is a schematic view of the second embodiment of the ink jet head production method in accordance with the present invention.

In the first embodiment, when the heater boards are placed on the base plate, the adhesive is coated in advance on the base plate, but in this embodiment, adhesive 3 is injected to fix each heater board 1 after each heater board 1 is placed on the base plate 2, which is accomplished in the following manner. That is, referring to FIG. 4, the base plate 2 is processed to provide it with suction holes 5 for securing the heater board 1, frame-like patterns constituting adhesive coating areas 6, and adhesive injection openings 4 through which the adhesive 3 can be injected from outside the heater boards 1 into the adhesive coating areas 6 after the heater boards are placed at the predetermined locations in the adhesive coating areas 6.

More specifically, the heater boards 1, the locations of which are fixed in a different processing area using the non-contact method, are aligned in a single line on the base plate 2 as they are in the first embodiment, and then; they are secured by suction through the suction holes 5. Thereafter, the adhesive 3 is injected into the adhesive coating areas 6 through the adhesive injection openings 4. It should be noted here that the adhesive 3 may be injected as each heater board 1 is placed and secured, or may be injected all at once after all the heater boards 1 are placed and secured. The suction through the suction holes 5 is stopped after the adhesive 3 is cured.

It should also be noted here that the locations of the adhesive injection openings 4 are not limited to those illustrated in FIG. 3; the locations are optional as long as the openings 4 are formed to lead to the adhesive coating area 6 located under the heater boards 1.

Embodiment 3

Figure 4:
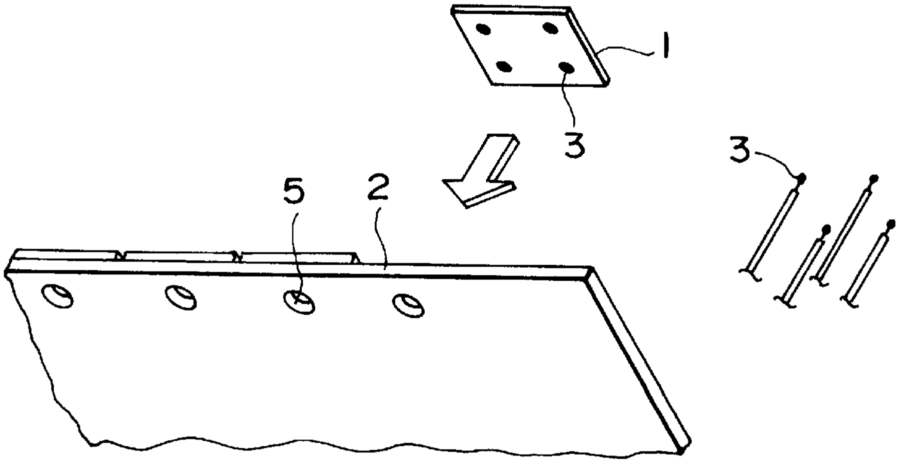
FIG. 4 is a schematic view of the third embodiment of the ink jet head in accordance with the present invention.

FIG. 4 is a schematic view of the third embodiment of the ink jet head production method in accordance with the present invention.

In the first and second embodiments described above, the adhesive 3 is coated on the base plate side, whereas it this embodiment, the adhesive 3 is coated on the side of the heater board 1, and then, the heater board 1 is pressed onto the base plate 2, as shown in FIG. 4.

More specifically, before the heater boards 1, the locations of which have been fixed in a different processing area as they have been in the first and second embodiments, are placed on the base plate 2, the adhesive 3 is coated on the back surfaces of the heater boards 1, on one to several points. In this case, the adhesive 3 must be coated so as to avoid the suction holes 5 provided on the base plate 2.

Then, the heater boards 1 are aligned in a single line on the base plate 2, and secured as they are sucked through the suction holes 5. The suction is stopped after the adhesive 3 is cured as it is in the first and second embodiments.

As for the adhesive 3, silicic adhesive with a small curing shrinkage is employed to prevent the heater boards 2 from shifting as the adhesive 3 is cured. The material for the adhesive 3 in this embodiment is also the same as the material used in the first and second embodiments.

Embodiment 4

FIGS. 5(A–C) are schematic views of the fourth embodiment of the ink jet-head production method in accordance with the present invention.

Figure 5A:
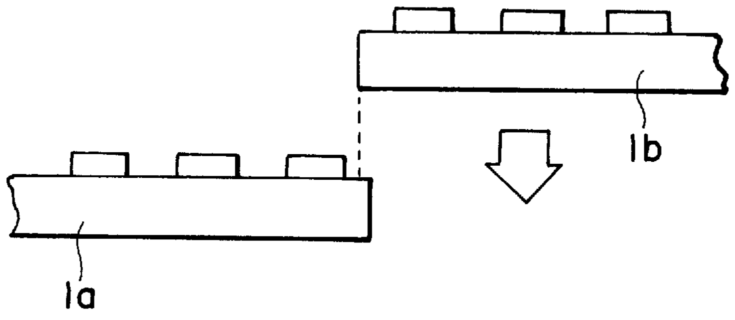
FIGS. 5(A–C) are schematic views of the fourth embodiment of the ink jet head production method in accordance with the present invention.
Figure 5B:
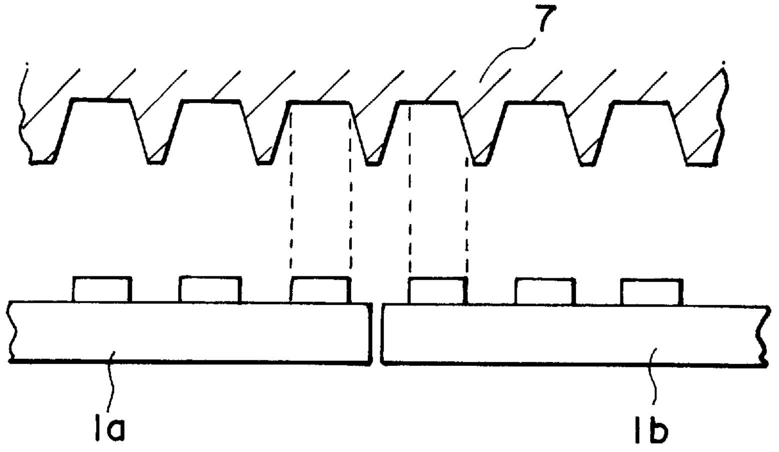

Referring to FIG. 5(A), it is assumed in this case that the sizes of heater boards 1*a* and 1*b* are not uniform (accurate); the size error of a heater board 1*a* is within the cutting tolerance of the heater board, and the size error of a heater board 1*b* exceeds the cutting tolerance of the heater board When such heater boards 1*a* and 1*b* are placed next to each other, at the normal arrangement points, respectively, they interfere with each other at the adjacent ends. In this embodiment, therefore, the heater board 1*b* is slightly shifted in the alignment direction, within a range which does not interfere with ejection performance, as shown in FIG. 5(B).

Further, even when the size errors of all heater boards fall within the cutting tolerance, if the distance between one end of a heater board and the closest heater on the same heater board is extremely different from the distance between the other end of the same heater and the closest heater on the same board, the location for such a heater board is shifted in the alignment direction, toward the processing heater board or away from it, within a range which does not interfere with the ejection performance.

In this embodiment, "range which does not interfere with the ejection performance" is a range in which each heater on the heater board remains within the boundary of the corresponding ink path groove of the top plate 7 (±8 $\mu$m).

Figure 5C:
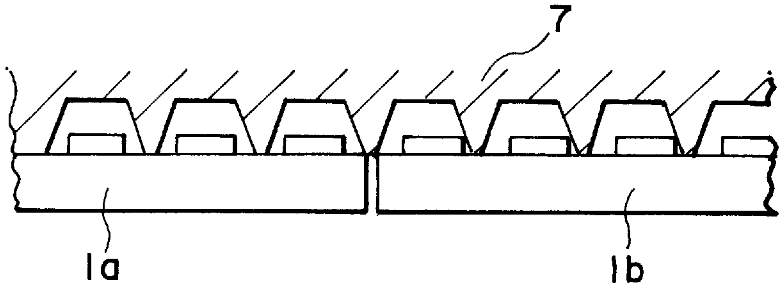

As a result, when the top plate 7 is joined, each heater is reliably placed within the boundary of the corresponding ink path groove, as shown in FIG. 5(C), creating no printing problem.

It is preferred that the heater board which is placed next to the displaced heater board 1*b* is such a heater board that has a size error which requires the heater board to be displaced in the direction opposite to the direction in which the preceding heater board 1*b* has been displaced.

In this case, the sizes of the heater boards are Measured by the non-contact method, and then, based on the measured sizes, the heater boards are paired to satisfy the alignment requirement between the heaters and grooves. Thereafter, they are aligned in a single line. More specifically, the heater boards are grouped into separate trays by their width in the alignment direction, using non-contact means such as image processing. Then, computation is made, based on the grouping data, to search for several combinations of the heater boards with different widths, which allows each heater of the heater boards to be within the boundary of the corresponding ink path groove of the extended top plate 7, so that a heater board combination most suitable for each of the extended top plates 7 can be employed. It is also acceptable that the sizes of the heater boards are measured immediately before placing them on the base plate 2, and the placement location of each heater board is adjusted on the basis of its measured size.

Further, the present invention is applicable to compensate for errors in the ink path groove pitch of the extended top plate.

More specifically, when an elongated top plate produced by injection molding or the like is processed using an excimer laser or the like to form the ink path grooves and ejection orifices thereon, errors sometimes occur in the ink path groove pitch (pitch error) due to processing errors. In such cases, the location of each ink path groove correspondent to one of the heaters of the heater boards is measured in advance by the non-contact method in a different processing area, or measured by the same non-contact method immediately before the heater board placement, and then, the heater board arrangement may be adjusted on the basis of the measurement date obtained in the aforementioned manner, so that each heater reliably falls within the boundary of the correspondent nozzle.

Embodiment 5

Figure 6A:
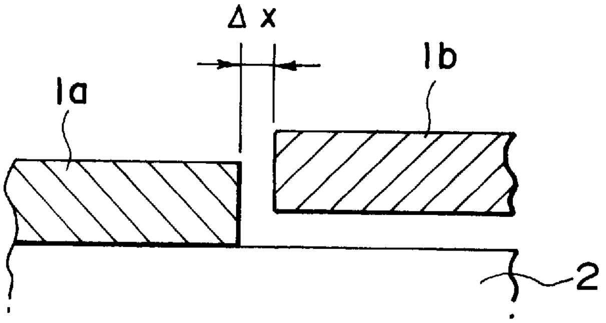
FIGS. 6(A–B) are a schematic views of the sixth embodiment of the ink jet head in accordance with the present invention.
Figure 6B:
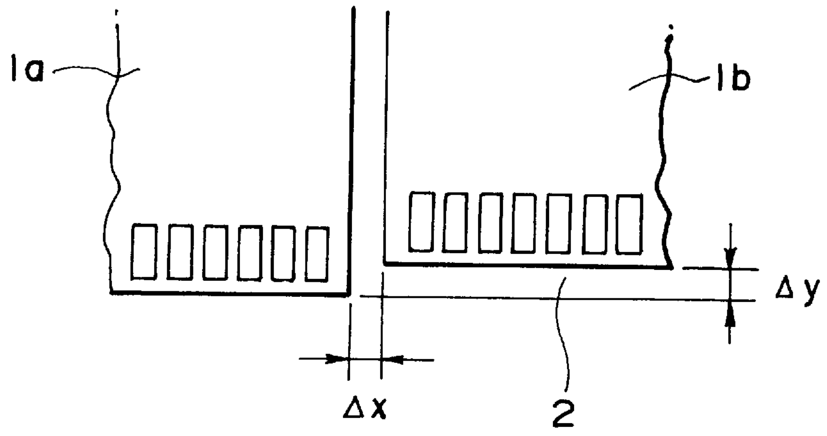

FIGS. 6(A) and 6(B) are schematic drawings depicting the fifth embodiment of the ink jet head production method in accordance with the present invention, in which methods for positioning the heater boards when abutting the heater boards against the base plate are illustrated. In these drawings, an alphanumeric reference 1*a* designates a preceding heater board; 1*b*, a heater board placed next: a referential symbol Δx, a gap between the adjacent heater boards; and Δy designates the placement error of the adjacent heater board 1*b* in the ink ejection direction.

In the first to fourth embodiments described above, before the heater boards are aligned on the base plate, their locations must be fixed. Therefore, one of the methods for fixing the heater board locations will be described below.

Referring to FIG. 6(A), in this embodiment of the production method, the heater board 1*b* to be placed next is temporarily held above the base plate 2, and the gap Δx between itself and the adjacent heater board is measured by the non-contact method, in order to fix its location in the horizontal direction. In this chase, the value of the heater board gap Δx can be changed according to the degree of non-uniformity in the heater board cutting accuracy.

Referring to FIG. 6(B), as for the heater board placement error in the ink ejection direction, the heater board is suspended above the base plate 2, and then, the heater board location is detected from above by the same non-contact method such as image processing, and then, the heater board 1*b* to be placed next is moved so that the amount of the placement error Δy in the ink ejection direction is reduced to zero.

After the location of the heater board 1*b* is fixed in the aforementioned two directions, the heater board 1*b* is placed on the base plate 2 to be aligned.

Consequently, the heater board placement error in terms of the gap Δx between the adjacent two heater boards becomes no more than ±1 μm, and the heater board placement error Δy in the ink ejection direction becomes no more than ±2 μm.

Figure 7:
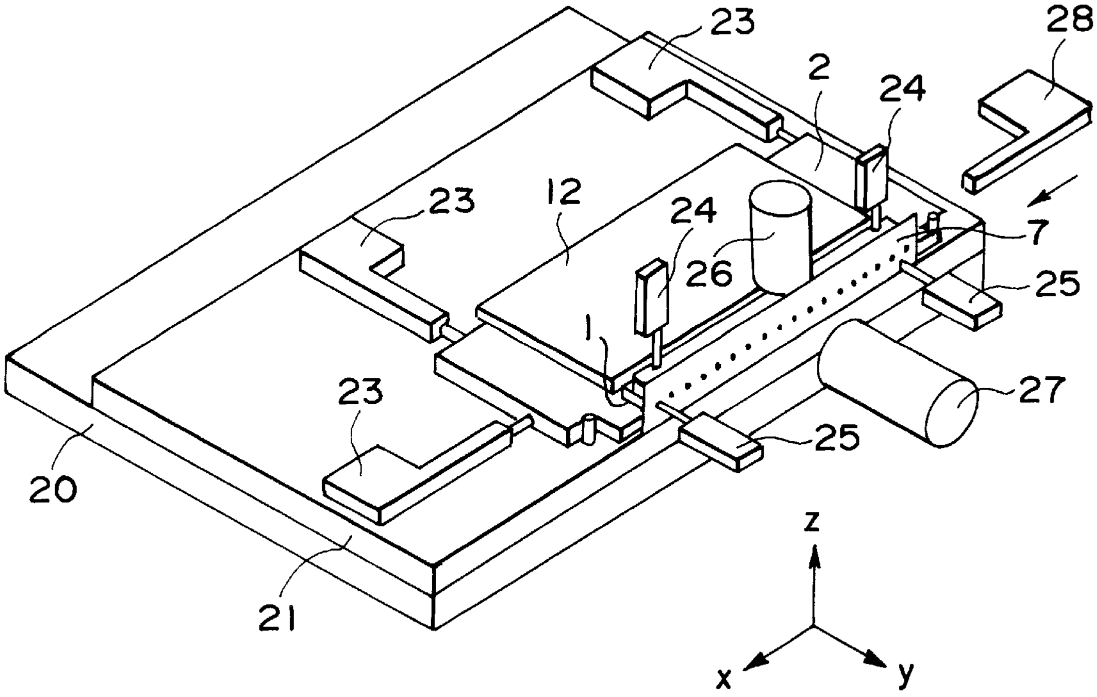
FIG. 7 is a schematic perspective view of an example of an assembly apparatus used in the ink jet head production method in accordance with the present invention.

FIG. 7 is a schematic perspective view of an example of an assembly apparatus used in the ink jet head production method in accordance with the present invention.

Embodiment 5

Figure 8:
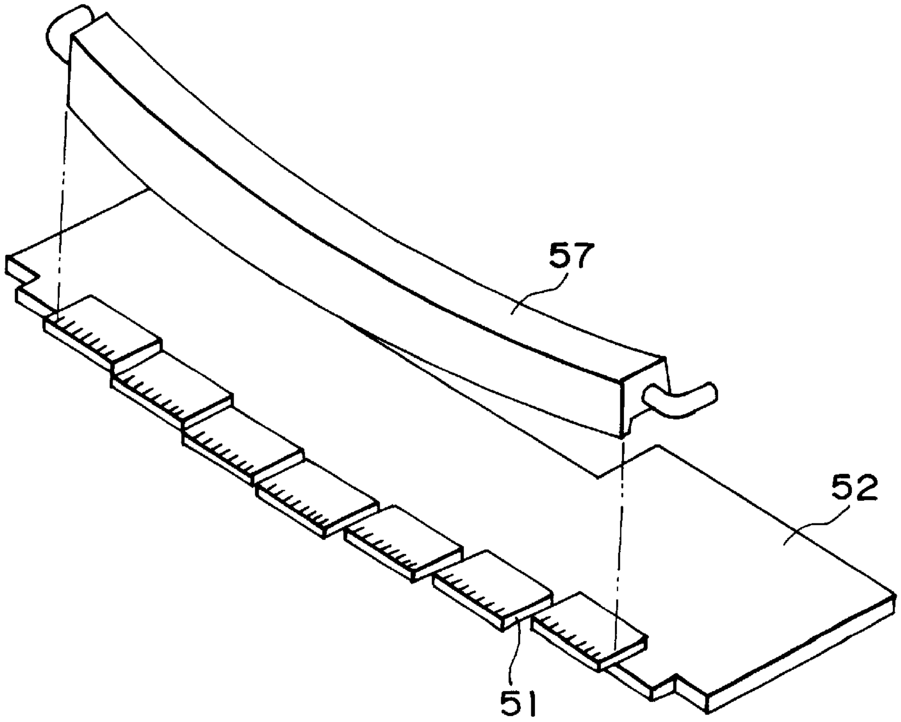
FIG. 8 is a schematic view of the fourth embodiment of the ink jet head production method in accordance with the present invention.

A top plate 57 illustrated in FIG. 8 also has ink ejection orifices, and is produced using injection molding or the like. However, this top plate 57 is different from the top plate 7 illustrated in FIG. 1 in that it is slightly deformed (warped). Therefore, the arrangement of the heater boards 51 is adjusted to match the deformation.

In this embodiment, the locational relationship among the heater boards 51 and base plate 52 will be described with reference to the top plate warpage in the ink ejection direction or the opposite direction thereto.

First, the warpage of the top plate 57 is measured using a non-contact means such as image processing or a laser-based measuring device. Then, the location of each heater board 51 is moved in the ink ejection direction or the opposite direction thereto, according to the warpage of the top plate 57 at the essential contact point between the heater board 51 and top plate 57. It should be noted here that the locational adjustment of the heater board 51 is made only in the ink ejection direction or the opposite direction thereto; the angle of the heater board 51 relative to the rotational direction in the horizontal plane is not adjusted, and also, the location of the heater board 51 relative to the lateral direction is not adjusted.

When the warpage of the top plate 57 is no more than a predetermined amount, the adjustment is not made. In this embodiment, this amount is set at 10 μm. This value may be varied according to the design of the top plate 57.

Embodiment 6

Next, the sixth embodiment of the ink jet head production method in accordance with the present invention will be described.

This embodiment shows an example of the methods for measuring the warpage of the top plate 57 in the fifth embodiment.

In this embodiments, the overall warpage of the top plate 57 is measured using non-contact means such as image processing or a laser-based measuring device, so that it can be determined whether or not the arrangement locations should be adjusted. When adjusted, a measurement is taken at the essential contact points between the top plate 57 and heater board 51 where adhesion is critical, using non-contact means such as real-time image processing or a laser-based measuring device. In the case of this embodiment, a measurement is taken at a point of the section called orifice plate, which has the ink ejection orifices. In actual practice, the arrangement location of the heater board 51 is adjusted in the ink ejection direction or the opposite direction thereto while measuring the warpage of the top plate 57 at the point of the orifice plate of the top plate 57.

It is also acceptable to measure in advance the top plate warpage at a separate processing area, and then to adjust the arrangement location data on the basis of the measured warpage.

As a result, the gap between the top plate 57 and heater board 51 becomes no more than 5 μm.

Embodiment 7

Next, the seventh embodiment of the ink jet head production method in accordance with the present invention will be described.

Figure 9:
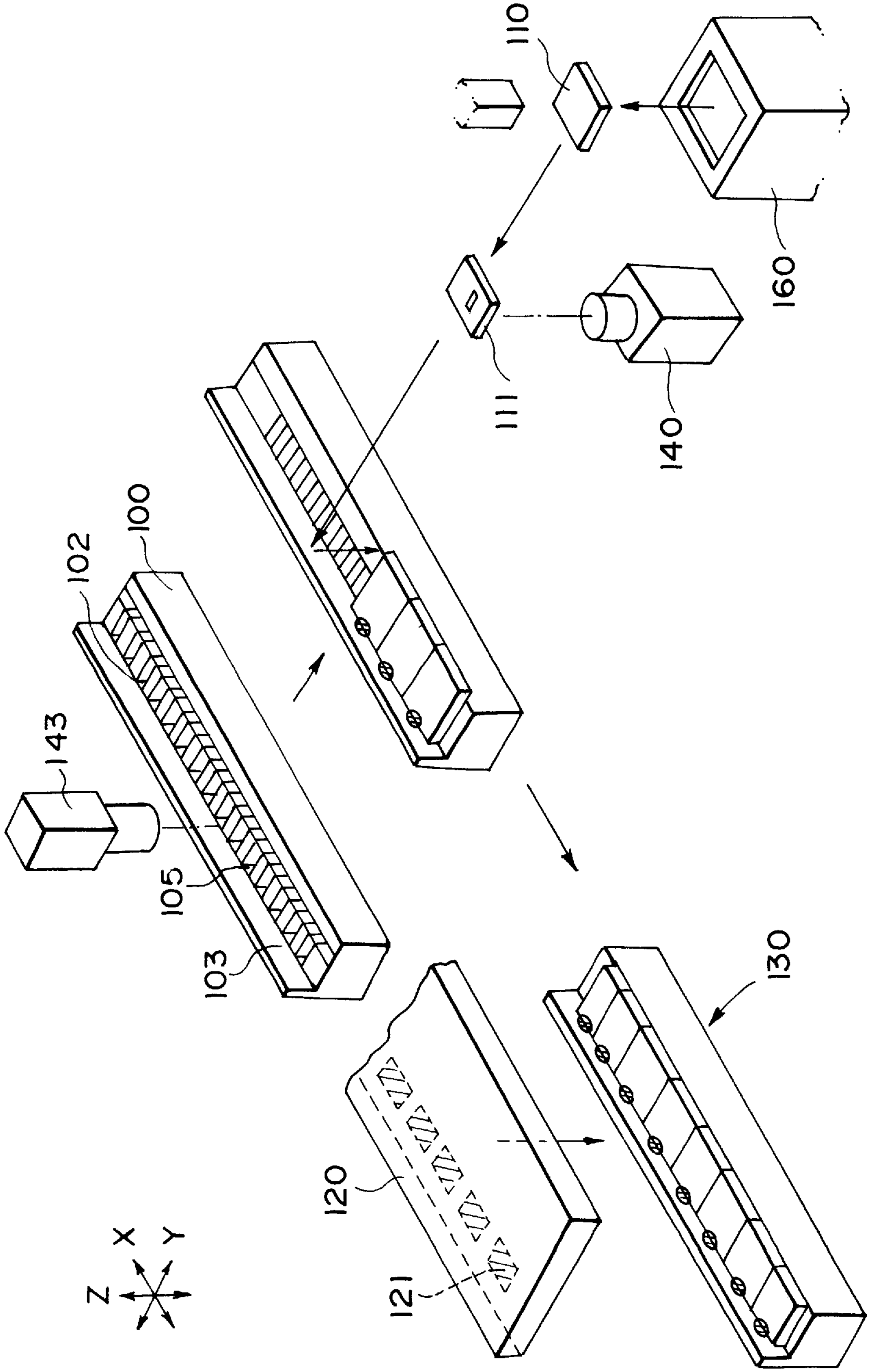
FIG. 9 is a perspective view of the general structure of the seventh embodiment of the present invention.

FIG. 9 is an explanatory perspective view depicting the general steps taken in the seventh embodiment.

In this embodiment, one of the automated versions of the preceding embodiments will be described. Referring to FIG. 9, a reference numeral 100 designates a top plate member, in which ink path grooves 102, an orifice plate 103, and nozzle holes 105 are formed in advance.

The top plate member 100 is held with an unillustrated jig, so that the ink path grooves 102 face upward. The top plate member 100 held in such a manner can be movable in the directions of arrows X and Y, using a Y stage (unillustrated) for moving the top plate member 100 from the component entry point to a processing point, and an X stage (unillustrated) for moving the top plate member from the processing point to the joining point where the base plate is joined.

A reference numeral 110 designates a heater board, which is positioned to make ink heating heaters 111 face downward. A reference numeral 120 designates a base plate, which is coated with adhesive 121 so that it can be adhered to a nozzle unit 130, which will be described below.

The heater board 110 is clasped with a finger 160. Its location and orientation can be controlled in 6 directions X, Y and Z, θ, θx and θy, using an automatic stage (unillustrated) which supports the finger 160.

Located between a positioning plate 160, which supplies the heater board 110 as it temporarily positions the heater board 110, and the top plate 100, is an optical observation system 140 for computing the heater location of the heater board 110, and the edge surface location of the heater board 110.

Located above the top plate 110 is an optical observation system 143 for detecting the location of the orifice plate 103 of the top plate member 103, and measuring the amount of the orifice plate deformation. The optical observation system 143 is movable in the longitudinal direction (X direction), and horizontal direction (Z direction), of the top plate member 100.

Next, a method for assembling the ink jet head using the above apparatus will be described.

The top plate member 100, in which the ink path grooves and nozzle holes have been formed in the preceding steps, is fixed so that it does not become loose while it is transferred from one point to the other, or while it is assembled with the other components.

Then, the optical observation system 143 is moved to the edge of the top plate member 100, by controlling the automatic stages X and Y.

FIG. 10(A) illustrates a state in which the optical observation system 143 has been moved to the edge of the top plate member 100. FIG. 10(B) illustrates the image obtained through the optical observation system.

Practically speaking, all top plate members 100 are not uniform; some of them become deformed while they are molded or processed. FIG. 11(A) depicts how the deformed top plate member 100 is measured.

Referring to FIG. 11(A), the optical observation system 143 is designed to move in such a manner that the locations at which it picks up the images are always the same locations relative to the X direction. But, since the top plate member 100 is deformed, the images picked up at observation points a, b and c illustrated in FIG. 11(A) look as illustrated in FIGS. 11(B), 11(C) and 11(D), correspondingly.

Referring to FIG. 11(B), referential symbols Xθ and Yθ designate referential lines in the X and Y directions, respectively. When the top plate member 100 is not deformed, the location of the orifice plate 103 of the top plate member 100 coincides with Yθ, whereas when the top plate member 100 is deformed, the location of the orifice plate 103 is Y1. This image is processed to compute the amount of the deformation ΔY at the observation point a. ΔY is obtained from the following formal:

$$\Delta Y = Y1 - Y\theta$$

The locational error ΔX of the top plate 100 relative to the X direction, which occurs when the top plate member 100 is inaccurately placed during the top plate member fixation, can be obtained by measuring the distance X1, which is the distance between the referential line Xθ and the center of the groove:

$$\Delta X = X1 - X\theta$$

The amount of the deformation of each top plate 100 is measured at optional observation points, so that the deformation corresponding to the top plate 100 can be measured. The measured amount of the deformation is stored in an unillustrated control computer.

After the amount of the deformation is measured at critical observation points, the top plate member 100 is transferred from the top plate observation point to the joining point where the heater board 110 and top plate member 100 are joined.

Next, the heater hoard 110, on which the ink heating heaters have been formed, is placed, with the heater side facing downward, on the finger 160, which serves as positioning plate for temporarily positioning the heater board 110. At this point, the heater board 110 is positioned with a reproducibility of no more than 10 μm. The positioned heater board 110 is clasped with the finger 160, and is moved upward to the point above the optical observation system 140 for determining heater position, as the finger moving stage is moved.

Figure 12A:
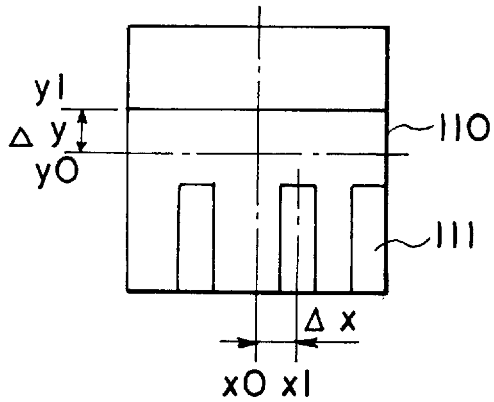
FIGS. 12(A–C) illustrates how the heater location on the heater board, and the heater board edge location, are computed, wherein (A) gives an image of the heater board 110 picked up through the optical observation system 143, and (B) and (C) depict states, respectively, immediately before the top plate member 100 and heater board 110 are joined.

FIG. 12(A) illustrates an image of the heater board 110 obtained through the optical observation system 140.

In FIG. 12(A), alphanumeric references x0 and y0 designate referential lines in the X and Y directions, respectively, in the image processing area. When the temporary positioning of the heater board 110 is accurate, the edge surface location of the heater board 110 in the Y direction coincides with y0, whereas when the temporary positioning of the heater board 110 is inaccurate, that is, when positioning accuracy is not uniform, the edge surface location of the heater board 110 becomes y1. This image is processed to calculate an error Δy in the temporary positioning, Δy is obtained from the following formula:

$$\Delta y = y1 - y0$$

An error Δx, which occurs due to inconsistent accuracy in temporary positioning of the heater board 110, can be obtained by determining a heater location x1:

$$\Delta x = x1 - x0$$

The values of the measured errors are stored in an unillustrated control computer.

After the errors Δx and Δy in the X and Y directions, respectively, are measured, the finger 160 is moved, whereby the heater board 110 is transferred to the joining point where the heater board 110 and top plate member 100 are joined, and is left on standby above the ink path grooves 102.

Figure 12B:
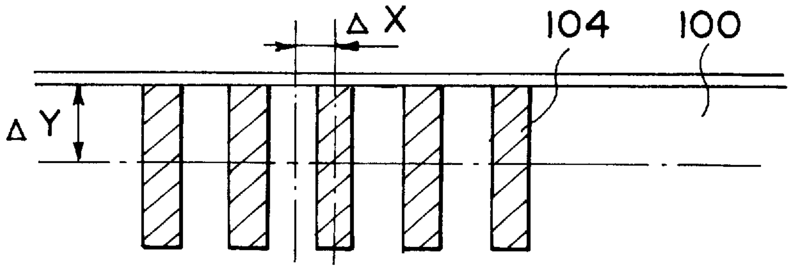
Figure 12C:
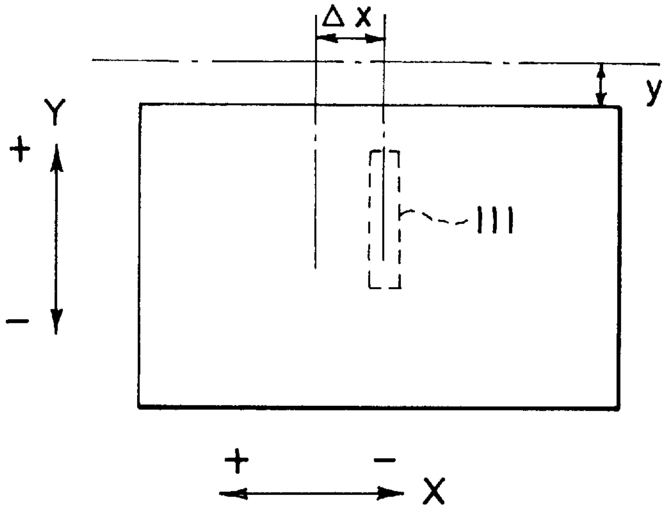

FIGS. 12(B) and 12(C) show the positional relationship between the top plate member 100 and heater board 110 immediately before they are joined. Referring to FIG. 12(B), it is assumed that according to measurement, the location of the top plate member 100 is off by ΔX and ΔY from corresponding joining reference lines, and the location of the heater board 110 is off by Δx and Δy. In this case, the distances the X and Y stages of the finger 160 must be moved to align the ink path grooves of the top plate member 100, with the heaters of the heater boards 110, and at the same time, to make the orifice plate 103 tightly contact with the edge of the heater board 110, are obtained from the following formulas:

Distance X stage must be moved=$\Delta x+\Delta X$

Distance Y stage must be moved=$\Delta y+\Delta Y$

After the heaters and ink path grooves are aligned in the manner described above, the Z stage of the finger 160 is lowered, and the top plate 100 and heater board 110 are joined. In order to keep them joined, adhesive 121 is coated using unillustrated means (dispenser or the like) before the Z stage of the finger 160 is retracted.

The step described above is repeated by the number of heater boards 110.

The top plate 100 and heater boards 110, which are joined in the aforementioned manner, constitute a nozzle unit 130, which is transferred to the point where the base plate is joined.

The base plate 120 coated in advance with the adhesive 121 is on standby above the base plate joining location. This base plate 120 is lowered and joined with the nozzle unit 130, producing an ink jet head with an extended width.

Embodiment 8

Figure 13:
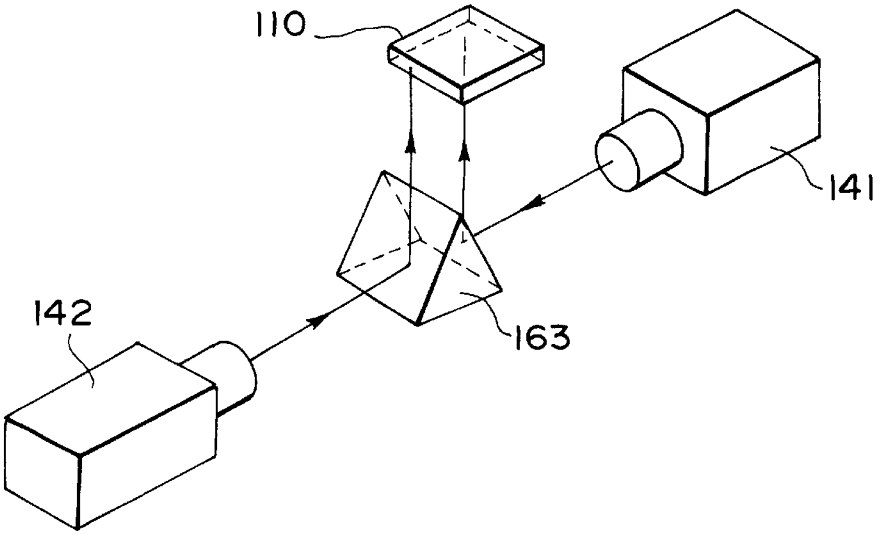
FIG. 13 is a schematic perspective view of the eighth embodiment of the present invention, illustrating a method for precisely computing the heater board location and orientation.
Figure 14A:
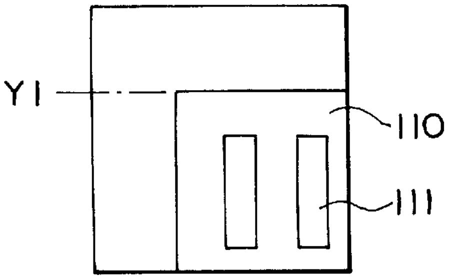
FIG. 14(A–B) are explanatory drawings for the eighth embodiment of the present invention, describing how the images of both edge surface locations of the heater board are picked up in order to compute precisely the heater board location.
Figure 14B:
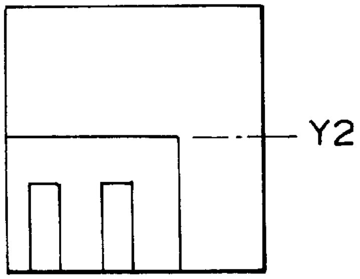
Figure 15:
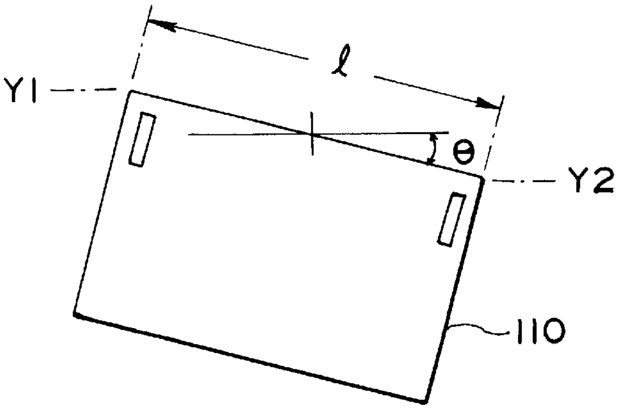
FIG. 15 is also an explanatory drawing for the eighth embodiment of the present invention, describing a method for computing the heater board skew from the data obtained by picking up the image of both edge surfaces of the heater board in order to compute precisely the heater board orientation.

FIGS. 13–15 depict the eighth embodiment of the present invention.

This embodiment improves the accuracy with which the top plate member 100 and heater board 110 are joined in the seventh embodiment.

FIG. 13 is a schematic perspective view of the essential structure of the eighth embodiment. In this drawing, reference numerals 141 and 142 are optical observation systems for computing the edge surface location of the heater board 110, and the heater locations. The optical observation systems 141 and 142 are disposed as illustrated in FIG. 13, so that the images of both edges of the heater board 110 can be picked up at the same time through a mirror 163. FIGS. 14(A) and 14(B) illustrate examples of the images picked up by the optical observation systems 141 and 142.

There are times when the temporarily positioned heater board 110 is skewed by an angle of θ as shown in FIG. 15. In such cases, the locational adjustment in the X and Y directions alone is not sufficient to accurately joining the top plate 100 and heater board 110.

The optical system arrangement illustrated in FIG. 13 is for adjusting the heater board 110 in the state described in the foregoing. The images picked up by the optical observation systems 141 and 142 are measured to compute the edge locations Y1 and Y2 of the heater board 110. The angle θ of the skewed heater board 110 is obtained from the following formula, wherein (1) is the width of the heater board 110:

$$\theta=\tan^{-1}((Y1-Y2)/1)$$

The angle θ computed in the aforementioned manner is used as the angle by which the θ slag of the finger 160 clasping the skewed heater board 110 is moved to straighten the skewed heater board 110. Therefore, the skew of the heater board 110, which cannot be eliminated by the temporary positioning alone, can be eliminated.

The present invention produces excellent results when used with a recording head, or a recording apparatus, employing any ink jet recording system, in particular, when used with a recording head, or a recording apparatus, employing the ink jet recording system in which thermal energy is used to form flying liquid droplets.

The typical structure and the operational principle are preferably the ones disclosed in U.S. Pat. Nos. 4,723,129 and 4,740,796. The principle and structure are applicable to a so-called on-demand type recording system and a continuous type recording system. Particularly, however, it is suitable for the on-demand type because the principle is such that at least one driving signal is applied to an electrothermal transducer disposed on a liquid (ink) retaining sheet or liquid passage, the driving signal being enough to provide such a quick temperature rise beyond a departure from nucleation boiling point, by which the thermal energy is provided by the electrothermal transducer to produce film boiling on the heating portion of the recording head, whereby a bubble can be formed in the liquid (ink) corresponding to each of the driving signals. By the production, development and contraction of the bubble, the liquid (ink) is ejected through an ejection outlet to produce at least one droplet. The driving signal is preferably in the form of a pulse, because the development and contraction of the bubble can be effected instantaneously, and therefore, the liquid (ink) is ejected with quick response.

The driving signal in the form of the pulse is preferably such as disclosed in U.S. Pat. Nos. 4,463,359 and 4,345,262. In addition, the temperature increasing rate of the heating surface is preferably such as disclosed in U.S. Pat. No. 4,313,124.

The structure of the recording head may be as shown in U.S. Pat. Nos. 4,558,333 and 4,459,600 wherein the heating portion is disposed at a bent portion, as well as the structure of the combination of the ejection outlet, liquid passage and the electrothermal transducer as disclosed in the above-mentioned patents.

In addition, the present invention is applicable to the structure disclosed in Japanese Laid-Open Patent Application No. 123670/1984 wherein a common slit is used as the ejection outlet for plural electrothermal transducers, and to the structure disclosed in Japanese Laid-Open Patent Application No. 138461/1984 wherein an opening for absorbing pressure wave of the thermal energy is formed corresponding to the ejecting portion.

The present invention is effectively applicable to a so-called full-line type recording head having a length corresponding to the maximum recording width. Such a recording head may comprise a single recording head and plural recording head combined to cover the maximum width.

In addition, the present invention is applicable to a replaceable chip type recording head which is connected electrically with the main apparatus and can be supplied with the ink when it is mounted in the main assembly, or to a cartridge type recording head having an integral ink container.

The provisions of the recovery means and/or the auxiliary means for the preliminary operation are preferable, because they can further stabilize the effects of the present invention. As for such means, there are capping means for the recording head, cleaning means therefore, pressing or sucking means, preliminary heating means which may be the electrothermal transducer, an additional heating element or a combination thereof. Also, means for effecting preliminary ejection (not for the recording operation) can stabilize the recording operation.

As regards the variation of the recording head mountable, it may be a single corresponding to a single color ink, or may be plural corresponding to the plurality of ink materials having different recording color or density. The present invention is effectively applicable to an apparatus having at least one of a monochromatic mode mainly with black, a multi-color mode with different color ink materials and/or a full-color mode using the mixture of the colors, which may be an integrally formed recording unit or a combination of plural recording heads.

Furthermore, in the foregoing embodiment, the ink has been liquid. It may be, however, an ink material which is solidified below the room temperature but liquefied at the room temperature. Since the ink is controlled within the temperature not lower than 30° C. and not higher than 70° C. to stabilize the viscosity of the ink to provide the stabilized ejection in usual recording apparatus of this type, the ink may be such that it is liquid within the temperature range when the recording signal is the present invention is applicable to other types of ink.

In one of them, the temperature rise due to the thermal energy is positively prevented by consuming it for the state change of the ink from the solid state to the liquid state. Another ink material is solidified when it is left, to prevent the evaporation of the ink. In either of the cases, the application of the recording signal producing thermal energy, the ink is liquefied, and the liquefied ink may be ejected. Another ink material may start to be solidified at the time when it reaches the recording material. The present invention is also applicable to such an ink material as is liquefied by the application of the thermal energy. Such an ink material may be retained as a liquid or solid material in through holes or recesses formed in a porous sheet as disclosed in Japanese Laid-Open Patent Application No. 56847/1979 and Japanese Laid-Open Patent Application No. 71260/1985. The sheet is faced to the electrothermal transducers. The most effective one for the ink materials described above is the film boiling system.

The ink jet recording apparatus may be used as an output terminal of an information processing apparatus such as word processor, computer or the like, as a copying apparatus combined with an image reader or the like, or as a facsimile machine having information sending and receiving functions.

While the invention has been described with reference to the structures disclosed herein, it is not confined to the details set forth and this application is intended to cover such modifications or changes as may come within the purposes of the improvements or the scope of the following claims.

What is claimed is:

1. A method for manufacturing an ink jet head, comprising a base plate, a plurality of heater boards disposed on the base plate, each of the heater boards having a plurality of energy generating means, a plurality of discharge openings for discharging ink which are arranged along a line, a plurality of ink passages communicating with the discharge opening, and a top plate which is a molded member made of a resin material and which has a plurality of grooves and which is a part of the plurality of ink passages, comprising the steps of:

arranging the heater boards so as to correspond to the line along which the discharge openings are arranged;

aligning the top plate and the heater boards with each other so as to cause the energy generating means to correspond the respective grooves; and uniting the top plate and the heater boards to constitute the ink passages.

2. A method according to claim 1, wherein after a shape of the line is determined, the plurality of heater boards are disposed on said base plate based on a result of the determination.

3. A method according to claim 1, further comprising the steps of;

disposing the heater boards directly on the top plate so as to correspond to the line; and fastening the heater boards to the base plate.

4. A method according to claim 3, further comprising the step of forming a frame pattern at portions of the heater board where the heater boards are placed.

5. A method according to claim 2, wherein when a given said heater board is disposed on the base plate, a position of the given said heater board disposed thereon is determined through a non-contact method, and the heater board is disposed on the base plate base on a result of the determination of the position.

6. A method according to claim 4, wherein an adhesive is applied on the base plate in the frame, and then the heater boards are bonded to the base plate by the adhesive.

7. A method according to claim 4, wherein the heater boards are placed on the base plate with alignment, and then an adhesive is supplied into the frame pattern to bond the heater boards to the base plate.

8. A method according to claim 3, wherein the disposing step comprises a step of determining a shape of the line, a step of determining the positions of the discharge openings, and a step of adjusting an orientation of the heater boards.

9. A method according to claim 8, wherein said step of adjusting the orientation comprises a step of calculating an adjusting amount for fine adjustment of the orientation of the heater board on the basis of the determined line and the determined positions, and the step of adjusting the orientation of the heater boards based on a result of calculation.

10. An ink jet head manufactured by a method according to any one of claims 1–9.

11. An ink jet head according to claim 10, wherein the energy generating element is an electrothermal transducer element for generating thermal energy for ejecting the ink.

12. An ink jet head according to claim 11, wherein the electrothermal transducer element produces film boiling of the ink.

13. An ink jet apparatus having an ink jet head according to claim 12.

* * * * *

UNITED STATES PATENT AND TRADEMARK OFFICE
CERTIFICATE OF CORRECTION

PATENT NO. : 5,888,333

DATED : March 30, 1999

INVENTOR(S) : TAKAYUKI ONO, ET AL.

It is certified that error appears in the above-identified patent and that said Letters Patent is hereby corrected as shown below:

Title page,

AT [56] REFERENCES CITED

FOREIGN PATENT DOCUMENTS

"3-177942" should read --3-177042--; and
"3-9177042" should read --3-177942--.

COLUMN 1

Line 13, "groves," should read --grooves,--;
Line 47, "mating" should read --making--; and
Line 64, "shortcomings" should read --shortcomings.--

COLUMN 3

Line 9, "healer" should read --heater--.

COLUMN 4

Line 8, "until" should read --unit--.

COLUMN 5

Line 13, "a" should be deleted; and
Line 37, "illustrates" should read --illustrate--.

UNITED STATES PATENT AND TRADEMARK OFFICE

CERTIFICATE OF CORRECTION

PATENT NO. : 5,888,333

DATED : March 30, 1999

INVENTOR(S): TAKAYUKI ONO, ET AL.

It is certified that error appears in the above-identified patent and that said Letters Patent is hereby corrected as shown below:

COLUMN 7

Line 59, "then;" should read --then,--; and
Line 60, "holes 5." should read --holes 4.--.

COLUMN 8

Line 10, "it" should read --in--; and
Line 38, "board" (second occurrence) should read --board.--.

COLUMN 9

Line 1, "Measured" should read --measured--; and
Line 54, "chase," should read --case,--.

COLUMN 10

Line 43, "embodiments," should read --embodiment,--.

COLUMN 12

Line 5, "formal:" should read --formula:--; and
Line 49, "positioning," should read --positioning;--.

UNITED STATES PATENT AND TRADEMARK OFFICE

CERTIFICATE OF CORRECTION

PATENT NO. : 5,888,333

DATED : March 30, 1999

INVENTOR(S): TAKAYUKI ONO, ET AL.

It is certified that error appears in the above-identified patent and that said Letters Patent is hereby corrected as shown below:

COLUMN 13

Line 49, "joining" should read --join--; and
Line 63, "θ slag" should read --θ stage--.

COLUMN 16

Line 5, "correspond" should read --correspond to--; and
Line 26, "base" should read --based--.

Signed and Sealed this

Twenty-fifth Day of April, 2000

Attest:

Q. TODD DICKINSON

*Attesting Officer*

*Director of Patents and Trademarks*